(12) United States Patent
Kuki et al.

(10) Patent No.: US 12,085,641 B2
(45) Date of Patent: Sep. 10, 2024

(54) IMAGE PROCESSING DEVICE, IMAGE PROCESSING METHOD, AND IMAGE PROCESSING COMPUTER PROGRAM

(71) Applicant: NEC Corporation, Tokyo (JP)

(72) Inventors: Naoko Kuki, Tokyo (JP); Norihiro Imai, Tokyo (JP); Kenzaburo Hagiwara, Tokyo (JP); Yoshitaka Oura, Tokyo (JP); Masanori Miyawaki, Tokyo (JP); Taichi Hirose, Tokyo (JP); Takashi Ikehara, Tokyo (JP)

(73) Assignee: NEC CORPORATION, Tokyo (JP)

( * ) Notice: Subject to any disclaimer, the term of this patent is extended or adjusted under 35 U.S.C. 154(b) by 397 days.

(21) Appl. No.: 17/437,997

(22) PCT Filed: Mar. 19, 2020

(86) PCT No.: PCT/JP2020/012422
§ 371 (c)(1),
(2) Date: Sep. 10, 2021

(87) PCT Pub. No.: WO2020/196308
PCT Pub. Date: Oct. 1, 2020

(65) Prior Publication Data
US 2022/0179063 A1   Jun. 9, 2022

(30) Foreign Application Priority Data

Mar. 28, 2019 (JP) ................ 2019-063369

(51) Int. Cl.
*G01S 13/90* (2006.01)
*G06T 7/536* (2017.01)

(52) U.S. Cl.
CPC ........ *G01S 13/9021* (2019.05); *G06T 7/536* (2017.01); *G06T 2207/10044* (2013.01)

(58) Field of Classification Search
CPC ........ G01S 19/49; G01S 19/485; G01S 17/89; G01S 13/9021; G06T 7/536; G06T 2207/10044
See application file for complete search history.

(56) References Cited

U.S. PATENT DOCUMENTS 10,222,178 B1   3/2019  Hunter, Jr. et al.
2003/0040971 A1*  2/2003  Freedenberg .......... G06Q 30/08
                                                    705/26.3

(Continued)

FOREIGN PATENT DOCUMENTS

CN   109166084 A   1/2019
JP   H06-148321 A   5/1994

(Continued)

OTHER PUBLICATIONS

International Search Report for PCT Application No. PCT/JP2020/012422, mailed on Jun. 23, 2020.

(Continued)

*Primary Examiner* — Bernarr E Gregory
*Assistant Examiner* — Samarina Makhdoom

(57) ABSTRACT

A foreshortening calculating unit of an image processing device calculates the degree of foreshortening in an imaging range at the time of synthetic aperture radar imaging using a flying object on the basis of an orbit at the time of the synthetic aperture radar imaging and elevation data of the earth's surface. A polygon calculating unit calculates a polygon representing an actual outer boundary of the imaging range by calculating an outer boundary of an actual imaging range of the imaging range using the degree of foreshortening. An area determining unit determines, by using the polygon, which of two or more areas determined in an area imaged by the synthetic aperture radar the imaging range belongs to. An added value adding unit performs a process which is performed according to the determined area (Continued)

on an image of the imaging range on the basis of a determination result of the area to which the imaging range belongs from the area determining unit.

15 Claims, 9 Drawing Sheets

(56) References Cited

U.S. PATENT DOCUMENTS

| | | |
|---|---|---|
| 2004/0263514 A1 | 12/2004 | Jin et al. |
| 2012/0133550 A1* | 5/2012 | Benninghofen ........ G09B 29/10 342/25 A |
| 2012/0274505 A1* | 11/2012 | Pritt ..................... G01S 13/904 342/25 A |
| 2013/0166212 A1* | 6/2013 | Zhandov ................ G01V 3/165 702/5 |
| 2015/0371431 A1* | 12/2015 | Korb ......................... G06T 7/75 382/113 |
| 2016/0259046 A1* | 9/2016 | Carlbom ................. G06T 17/05 |
| 2018/0011187 A1* | 1/2018 | Katayama ........... G01S 13/9023 |
| 2018/0174312 A1* | 6/2018 | Phillips ................. G01C 11/06 |
| 2018/0348361 A1* | 12/2018 | Turbide ............. G01S 13/9023 |
| 2021/0302567 A1 | 9/2021 | Toriya |

FOREIGN PATENT DOCUMENTS

| | | | |
|---|---|---|---|
| JP | 2004-220516 A | 8/2004 | |
| JP | 2004-333445 A | 11/2004 | |
| JP | 2004-341422 A | 12/2004 | |
| JP | 4202184 B2 * | 12/2008 | ............. G01S 13/90 |
| JP | 2013-171335 A | 9/2013 | |
| JP | 2015-114147 A | 6/2015 | |
| JP | 5636085 B1 | 7/2015 | |
| RU | 2531802 C2 | 10/2014 | |
| WO | 2018/056129 A1 | 3/2018 | |

OTHER PUBLICATIONS

Russian Office Action for RU Application No. 2021127488 mailed on Jun. 14, 2022 with English Translation.
Extended European Search Report for EP Application No. EP20779958.6 dated on Jul. 21, 2022.
Christian Rossi et al: "High-Resolution InSAR Building Layovers Detection and Exploitation", IEEE Transactions on Geoscience and Remote Sensing, vol. 53, No. 12. Dec. 1, 2015, pp. 6457-6468, XP011668181, ISSN: 0196-2892, DOI: 10.1109/TGRS.2015. 2440913.

* cited by examiner

IMAGE PROCESSING DEVICE, IMAGE PROCESSING METHOD, AND IMAGE PROCESSING COMPUTER PROGRAM

This application is a National Stage Entry of PCT/JP2020/012422 filed on Mar. 19, 2020, which claims priority from Japanese Patent Application 2019-063369 filed on Mar. 28, 2019, the contents of all of which are incorporated herein by reference, in their entirety.

TECHNICAL FIELD

The present invention relates to an image processing device, an image processing method, and an image processing computer program.

BACKGROUND ART

There is a technique called synthetic aperture radar serving as a virtual large aperture surface in which the synthetic aperture radar is mounted in a flying object such as an artificial satellite and is moved. Images captured by synthetic aperture radar have been utilized more and more. As a feature in an image captured by synthetic aperture radar, there is a phenomenon called "foreshortening" in which a point with a high elevation appears nearer, which causes a problem. In the related art, Patent Document 1 discloses a method of solving the problem of "foreshortening" in which image processing as a countermeasure against the "foreshortening" is performed on a captured image on the basis of depths of pixels in the captured image of synthetic aperture radar and then target image processing is performed.

PRIOR ART DOCUMENTS

Patent Documents

[Patent Document 1]
Japanese Unexamined Patent Application, First Publication No. 2015-114147

SUMMARY OF INVENTION

Problems to be Solved by the Invention

There is a service of setting predetermined areas in a range which is being imaged by synthetic aperture radar and providing an image in which different values are added to the set areas by performing different processing on the set areas according to the set areas. At this time, it is necessary to perform image processing twice on a captured image in order to perform the target image processing as described in the related art. That is, it is necessary to perform first image processing on a captured image for the purpose of countermeasure against the problem of "foreshortening" and then to perform second image processing which is the target processing on the captured image subjected to the first image processing. Therefore, an objective of the invention is to provide an image processing device, an image processing method, and an image processing computer program that can solve the aforementioned problem.

Means for Solving the Problems

An image processing device according to a first aspect of the invention includes: a foreshortening calculating unit configured to calculate the degree of foreshortening in an imaging range at the time of synthetic aperture radar imaging using a flying object on the basis of a trajectory at the time of the synthetic aperture radar imaging and elevation data of the Earth's surface; a polygon calculating unit configured to calculate a polygon representing an actual outer boundary of the imaging range by calculating an outer boundary of an actual imaging range of the imaging range using the degree of foreshortening; an area determining unit configured to determine, by using the polygon, which of two or more areas determined in an area imaged by the synthetic aperture radar the imaging range belongs to; and an added value adding unit configured to perform a process which is performed according to the determined area on an image of the imaging range on the basis of a determination result of the area to which the imaging range belongs from the area determining unit.

An image processing method according to a second aspect of the invention includes: calculating a degree of foreshortening in an imaging range at the time of synthetic aperture radar imaging using a flying object on the basis of an orbit at the time of the synthetic aperture radar imaging and elevation data of the earth's surface; calculating a polygon representing an actual outer boundary of the imaging range by calculating an outer boundary of an actual imaging range of the imaging range using the degree of foreshortening; determining, by using the polygon, which of two or more areas determined in an area imaged by the synthetic aperture radar the imaging range belongs to; and performing a process which is performed according to the determined area on an image of the imaging range on the basis of a determination result of the area to which the imaging range belongs.

An image processing computer program according to a third aspect of the invention causes a computer to perform: calculating a degree of foreshortening in an imaging range at the time of synthetic aperture radar imaging using a flying object on the basis of an orbit at the time of the synthetic aperture radar imaging and elevation data of the earth's surface; calculating a polygon representing an actual outer boundary of the imaging range by calculating an outer boundary of an actual imaging range of the imaging range using the degree of foreshortening; determining, using the polygon, which of two or more areas determined in an area imaged by the synthetic aperture radar the imaging range belongs to; and performing a process which is performed according to the determined area on an image of the imaging range on the basis of a determination result of the area to which the imaging range belongs.

Advantageous Effects of the Invention

Accordingly, it is possible to provide an image in which a target added value is added to a captured image captured by synthetic aperture radar through one instance of processing.

EXAMPLE EMBODIMENTS

Hereinafter, an image processing device according to an embodiment of the invention will be described with reference to the accompanying drawings. Before the image processing device according to the embodiment of the invention will be described, foreshortening in a captured image captured by synthetic aperture radar will be first described below with reference to FIGS. 1 to 3.

Synthetic aperture radar will be first described below. The synthetic aperture radar means radar that serves as a virtual large aperture by movement of a flying object such as an artificial satellite. In the synthetic aperture radar, an object is observed by applying electromagnetic waves such as microwaves or millimeter waves to the object and analyzing reflection signals therefrom.

Figure 1:
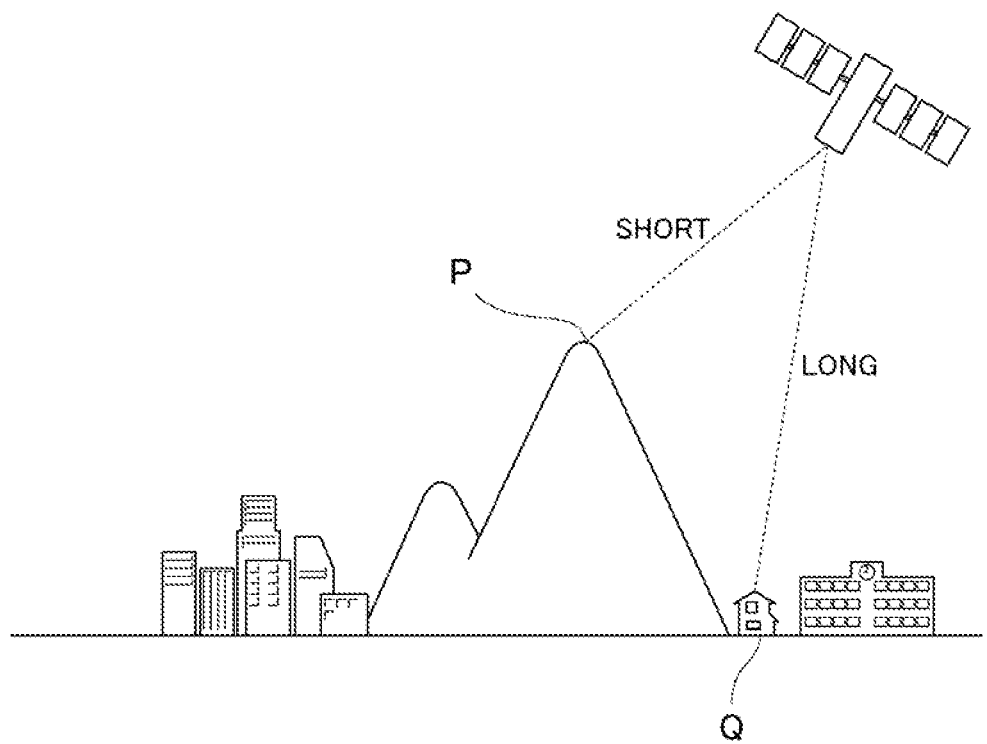
FIG. 1 is a diagram illustrating foreshortening in synthetic aperture radar.

FIG. 1 is a diagram illustrating the principle of foreshortening in a captured image captured by synthetic aperture radar.

In the following description, an artificial satellite is used as an example of a flying object that performs imaging using the synthetic aperture radar. In FIG. 1, an example in which an area including the summit of a mountain P with a high elevation and a point Q on a building with a low elevation is imaged using the synthetic aperture radar is illustrated. In imaging using the synthetic aperture radar, electromagnetic waves are applied to an object and a distance is measured using a time from application of electromagnetic waves to reception of a reflection signal. In the example illustrated in FIG. 1, the time from application of electromagnetic waves to reception of a reflection signal is shorter on the summit of a mountain P than on the point Q on the building. Accordingly, the synthetic aperture radar erroneously recognizes that the point P is nearer than the point Q. As a result, a phenomenon called "foreshortening" in which the point P appears nearer in an image captured by the synthetic aperture radar occurs.

Figure 2:
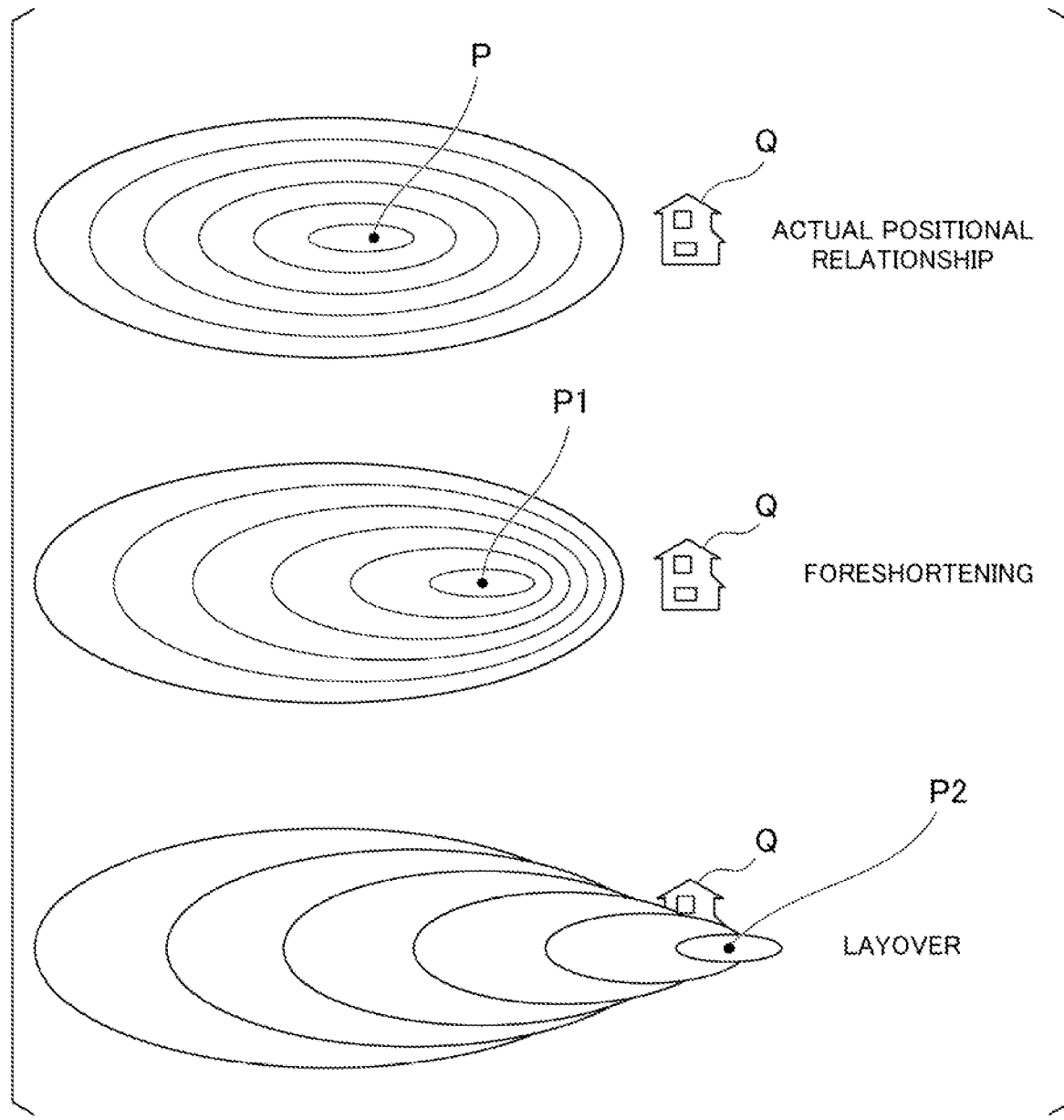
FIG. 2 is a diagram illustrating foreshortening in synthetic aperture radar.

FIG. 2 illustrates an example of an actual positional relationship in the example illustrated in FIG. 1 and a shift due to "foreshortening" in the synthetic aperture radar. The upper part of FIG. 2 illustrates an actual positional relationship between the summit of a mountain P with a high elevation and the point Q on the building with a low elevation. The middle part and the lower part of FIG. 2 illustrate examples of an image which is captured by the synthetic aperture radar. In the principle described above with reference to FIG. 1, a point with a high elevation (the summit of a mountain P with a high elevation) appears at a point indicated by reference sign P1 as if it leaned toward the artificial satellite as illustrated in the middle part of FIG. 2. In this way, learning of the point with a high elevation (the summit of a mountain P with a high elevation) toward the artificial satellite as illustrated in the middle part of FIG. 2 is called "foreshortening." A point foreshortens increasingly as the elevation thereof becomes higher, and a point with a high elevation (the summit of a mountain P with a high elevation) and the position of a point with a low elevation (the point Q on the building) appearing at a point indicated by reference sign P2 have a relationship therebetween as if they were inverted as illustrated in the lower part of FIG. 2. This phenomenon is called "layover" which is an extreme case of foreshortening.

Figure 3:
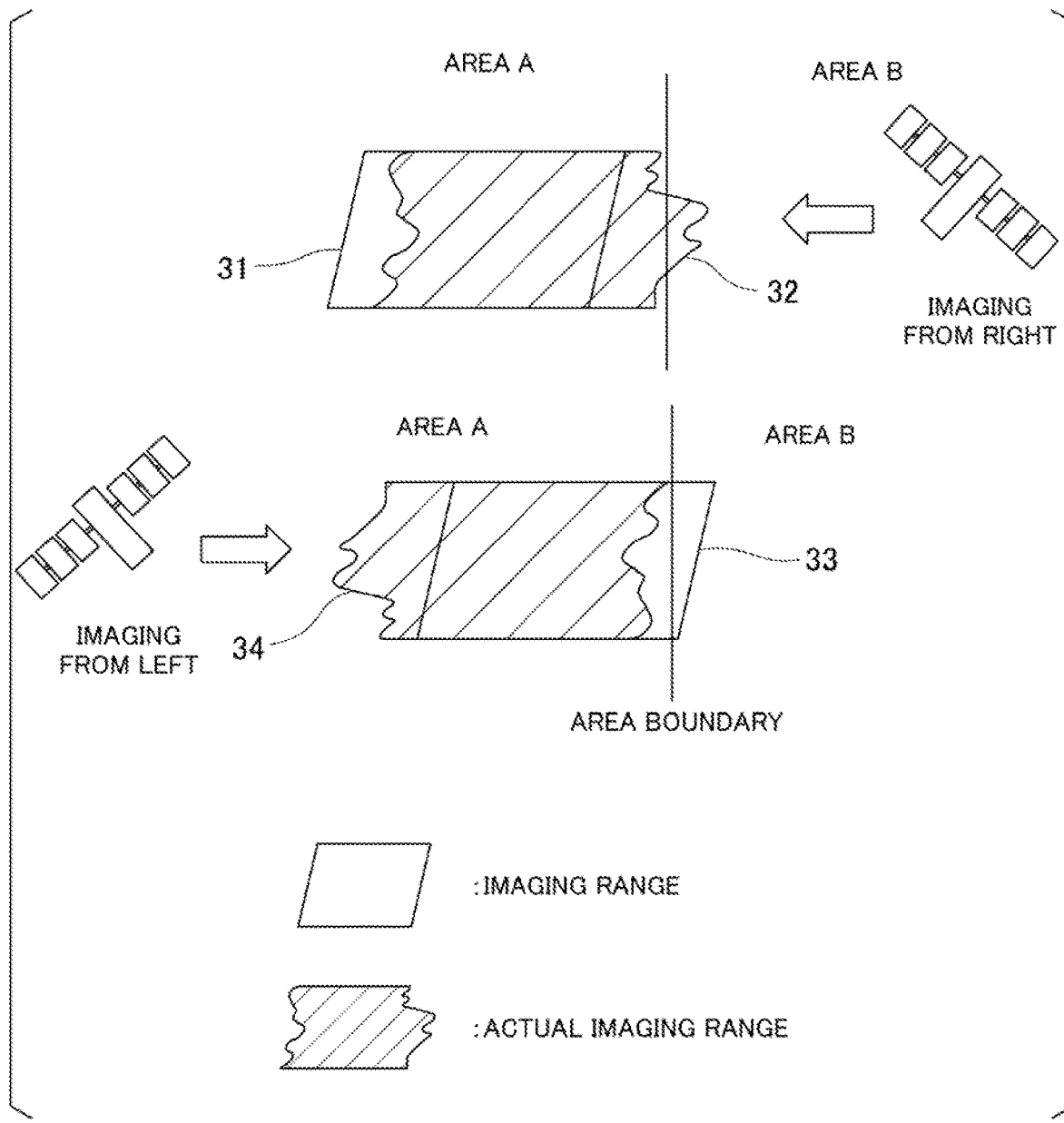
FIG. 3 is a diagram illustrating foreshortening in synthetic aperture radar.

FIG. 3 is a diagram illustrating an example in which a planned imaging range and a range which is actually imaged are different from each other due to "foreshortening." In FIG. 3, the left side of a vertical line is defined as area A and the right side is defined as area B.

The upper part of FIG. 3 illustrates an example in which area A is imaged from the right side using the synthetic aperture radar. In the example illustrated in the upper part of FIG. 3, the whole image of a planned imaging range 31 is in area A. However, the image of the imaging range 31 is an image including an influence of "foreshortening" and the image of an actual imaging range for the image of the imaging range 31 is an image obtained by imaging a hatched range 32.

In the lower part of FIG. 3, an example in which a range including a part of area B is imaged from the left side using the synthetic aperture radar is illustrated.

In the example illustrated in the upper part of FIG. 3, the image of the planned imaging range 33 includes a part of area B along with area A. However, the image of the imaging range 33 is an image including an influence of "foreshortening," the image of the actual imaging range for the image of the imaging range 33 is an image obtained by imaging a hatched range 34, and the entire actual imaging range is included in area A. In this way, when an area different from the imaging area due to "foreshortening" is imaged, determination of an area is affected.

Figure 4:
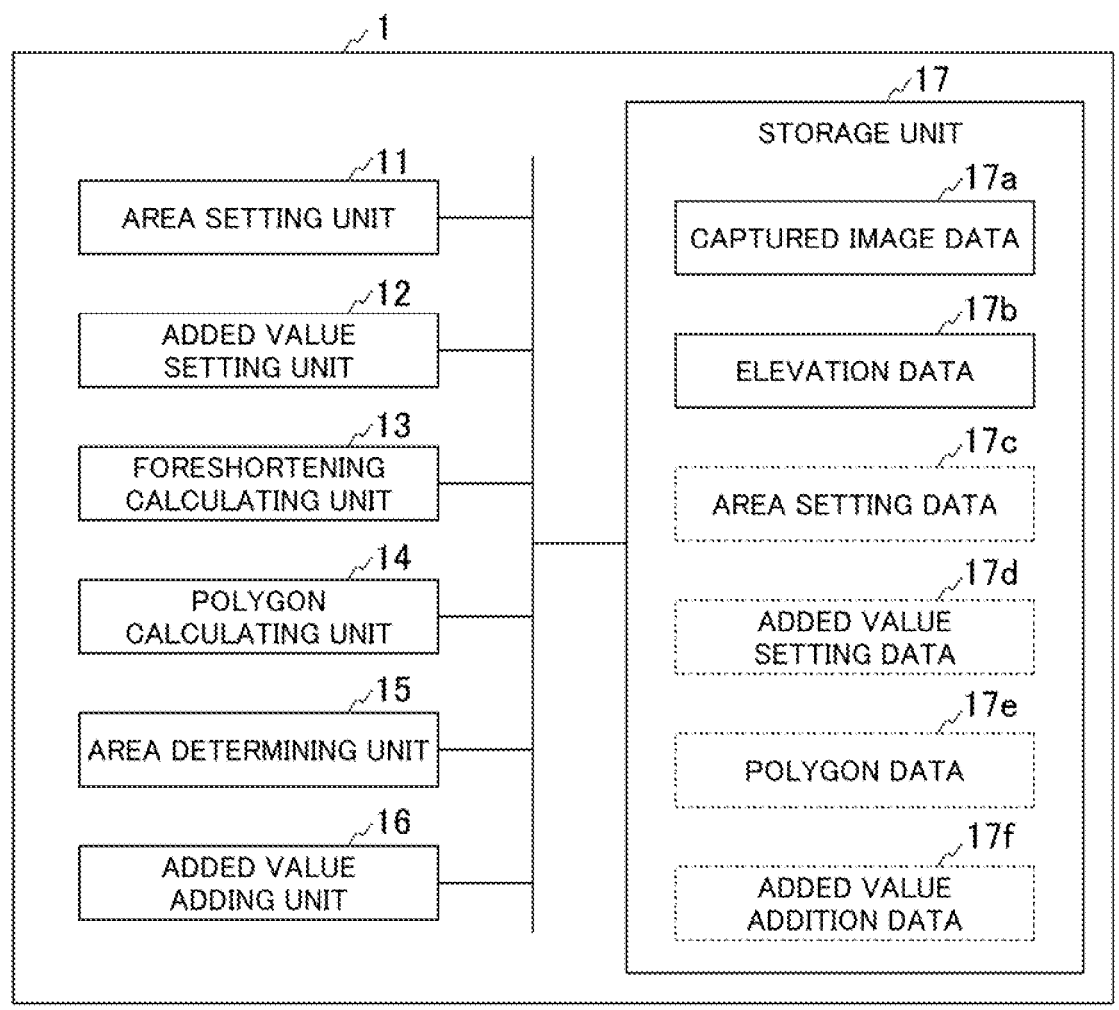
FIG. 4 is a block diagram illustrating functions of an image processing device according to an embodiment of the invention.

FIG. 4 is a functional block diagram illustrating an image processing device 1 according to an embodiment of the invention. As illustrated in FIG. 4, the image processing device 1 includes an area setting unit 11, an added value setting unit 12, a foreshortening calculating unit 13, a polygon calculating unit 14, an area determining unit 15, an added value adding unit 16, and a storage unit 17. The storage unit 17 stores captured image data 17a and elevation data 17b. In addition, the storage unit 17 stores area setting data 17c, added value setting data 17d, polygon data 17e, and added value addition data 17f in the course of processing which is performed by the image processing device 1.

The captured image data 17a stored in the storage unit 17 is data on a captured image captured by synthetic aperture radar. The captured image is an image in an area imaged by the synthetic aperture radar and includes images of a plurality of imaging ranges. The elevation data 17b is elevation data of the earth's surface based on a digital elevation model (DEM) or a geoid height. Here, the "digital elevation model"

is a model for digitally representing the topography of the earth's surface. The "geoid height" is a height from an equigeopotential surface which matches the earth's mean sea level very well.

The area setting unit 11 performs a process of setting two or more areas to add different added values through different image processing in an area imaged by the synthetic aperture radar. The area setting unit 11 stores the set areas as area setting data 17c in the storage unit 17.

The added value setting unit 12 performs a process of setting added values for the areas set by the area setting unit 11. The added value setting unit 12 correlates information on added values for the areas set by the area setting unit 11 with the areas and stores the correlated information as added value setting data 17d in the storage unit 17. "Added value" mentioned herein means certain processing on a captured image. "Added value" also means image processing corresponding to an added value.

The foreshortening calculating unit 13 performs a process of calculating the degree of foreshortening in an imaging range at the time of the synthetic aperture radar imaging on the basis of an orbit of the synthetic aperture radar using a flying object at the time of imaging and the elevation data 17b of the earth's surface.

The polygon calculating unit 14 performs a process of calculating a polygon representing an actual outer boundary of an imaging range by calculating an outer boundary of an actual imaging range using the degree of foreshortening in the imaging range calculated by the foreshortening calculating unit 13. The polygon calculating unit 14 stores the calculated polygon as polygon data 17e in the storage unit 17.

The area determining unit 15 determines to which of the areas set by the area setting unit 11 the imaging range belongs using the polygon calculated by the polygon calculating unit 14. The area determining unit 15 uses the area setting data 17c and the polygon data 17e for this processing.

The added value adding unit 16 performs a process which is determined for a determined area on an image of the imaging range on the basis of the result of determination of the area to which the imaging range belongs from the area determining unit 15. The added value adding unit 16 performs the processing using the area setting data 17c and the added value setting data 17d, and stores the result of processing performed on the image of the imaging area as added value addition data 17f in the storage unit 17.

Figure 5:
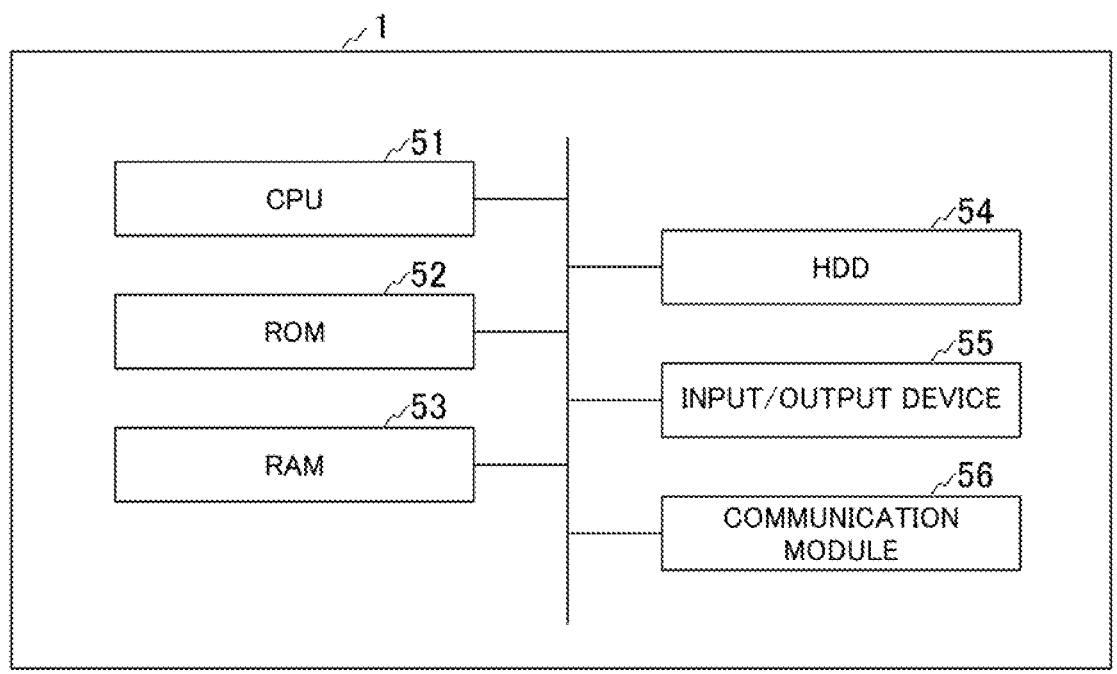
FIG. 5 is a block diagram illustrating a hardware configuration of the image processing device according to the embodiment of the invention.

FIG. 5 is a diagram illustrating a hardware configuration of the image processing device 1 according to the embodiment of the invention.

The image processing device 1 includes a central processing unit (CPU) 51, a read only memory (ROM) 52, a random access memory (RAM) 53, a hard disk drive (HDD) 54, an input/output device 55, and a communication module 56.

The CPU 51 realizes the functions of the image processing device 1 by executing a program stored in a recording medium such as the ROM 52 or the HDD 54.

The HDD 54 also stores data necessary for realizing the functions of the image processing device 1.

The input/output device 55 is a device such as a keyboard, a mouse, a touch panel, or a display device.

The communication module 56 is used when connection to a network is necessary, and controls communication with the network.

Figure 6:
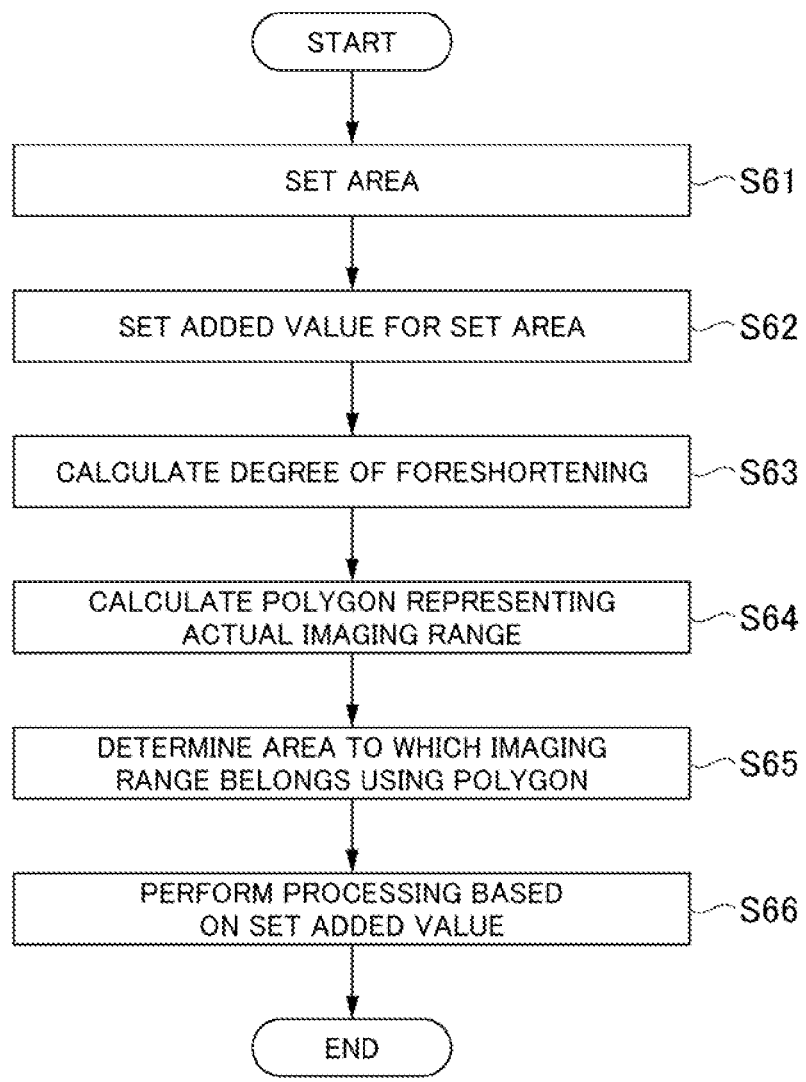
FIG. 6 is a flowchart illustrating a routine which is performed by the image processing device according to the embodiment of the invention.

FIG. 6 is a flowchart illustrating a routine which is performed by the image processing device 1 according to the embodiment of the invention. In the following description, operations of the image processing device 1 will be described along the routine illustrated in FIG. 6. A captured image captured by the synthetic aperture radar includes images of a plurality of imaging areas. As will be described below, processing of the foreshortening calculating unit 13, the polygon calculating unit 14, the area determining unit 15, and the added value adding unit 16 is performed on each imaging area or some of the plurality of imaging areas.

Figure 7:
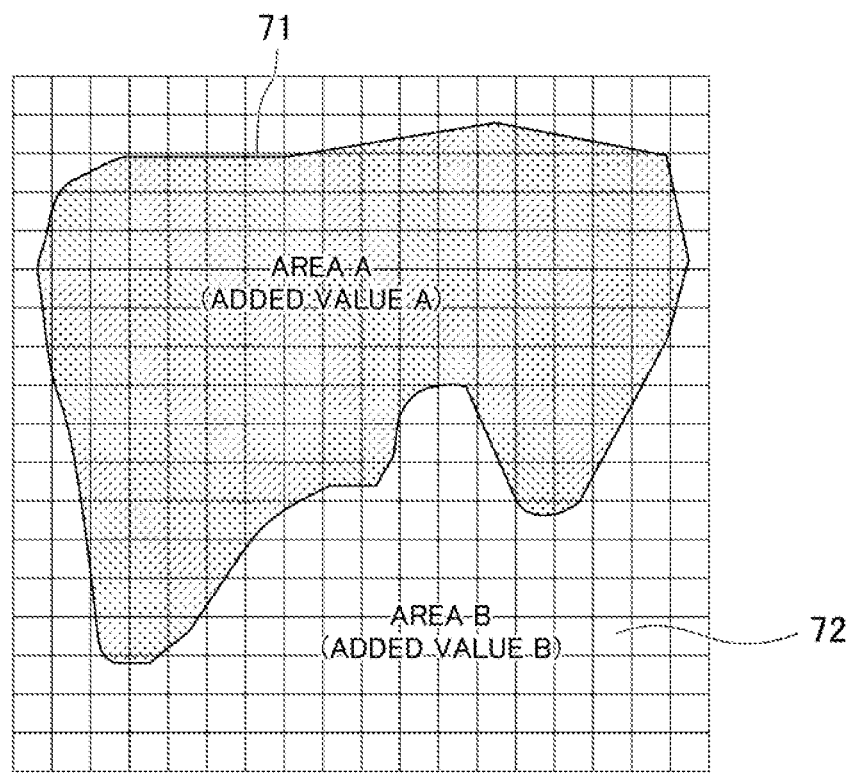
FIG. 7 is a diagram illustrating an example of area setting and added value setting which are performed by the image processing device according to the embodiment of the invention.

The area setting unit 11 performs a process of setting two or more areas in an area imaged by the synthetic aperture radar, the two or more areas being areas to which different added values are added through different processing (Step S61). FIG. 7 illustrates an example in which an area A 71 and an area B 72 are set in an area imaged by the synthetic aperture radar in Step S61. FIG. 7 illustrates an example in which a range imaged by the synthetic aperture radar is divided into grid squares having values of position information such as latitude and longitude. Area setting of the area setting unit 11 is allowed to be performed by a user using a user interface of the image processing device 1 or is performed by taking area setting data which is separately set. The area setting unit 11 stores the set areas as the area setting data 17c in the storage unit 17.

The added value setting unit 12 determines processing which is performed on the areas set by the area setting unit 11 (Step S62). The processing set herein is image processing corresponding to added values which are provided.

An example of the image processing is image processing for providing an image of which a resolution varies depending on areas. In this case, an added value for an area which provides a high-resolution image is generally high value, and an added value for an area which provides a low-resolution image is generally low value. FIG. 7 illustrates an example in which setting of processing for added value A in the area A 71 and setting of processing for added value B in the area B 72 are performed by the added value setting unit 12. The added value setting unit 12 correlates information on processing which is performed for the areas with the areas and stores the correlated information as the added value setting data 17d in the storage unit 17.

The foreshortening calculating unit 13 calculates the degree of foreshortening in an imaging range at the time of the synthetic aperture radar imaging on the basis of the orbit of the synthetic aperture radar using an artificial satellite at the time of imaging and the elevation data of the earth's surface (Step S63). In Step S63, the foreshortening calculating unit 13 calculates the "degree of foreshortening" by simulation using the elevation data of the earth's surface based on a digital elevation model (DEM) or a geoid height. Specifically, the foreshortening calculating unit 13 calculates the "degree of foreshortening" from a difference between a position in appearance and an actual position at each point on the earth's surface using an arrival time of reflected waves by simulating what the arrival time of reflected waves from the earth's surface is when the artificial satellite applies electromagnetic waves from the orbit at the time of imaging. It is preferable that the process of Step S63 be performed in units corresponding to pixels in consideration of the processing of the polygon calculating unit 14.

In the process of Step S63, a planned value of the orbit of the artificial satellite at the time of imaging may be used as the information on the orbit of the artificial satellite, and a measured value of the orbit of the artificial satellite after imaging can be preferably used. Accordingly, it is possible to calculate the "degree of foreshortening" with high accuracy. As a result, the area determining unit 15 can more accurately determine the area.

Figure 8:
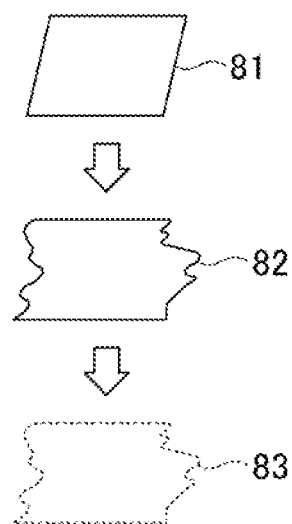
FIG. 8 is a diagram illustrating an example of polygon calculation which is performed by the image processing device according to the embodiment of the invention.

The polygon calculating unit 14 calculates a polygon indicating an outer boundary of an actual imaging range by actually calculating the outer boundary of the imaging range in the imaging range using the degree of foreshortening calculated by the foreshortening calculating unit 13 (Step S64). FIG. 8 is a diagram illustrating an example of the process of Step S64. Reference sign 81 denotes an area which is defined as a planned imaging range. Reference sign 82 denotes an example of an outer boundary of an actual imaging range in the imaging range 81 which is calculated using the degree of foreshortening calculated by the foreshortening calculating unit 13. Reference sign 83 denotes an example of a polygon calculated from the outer boundary of the actual imaging range. The polygon calculating unit 14 stores the calculated polygon as the polygon data 17e in the storage unit 17.

Figure 9:
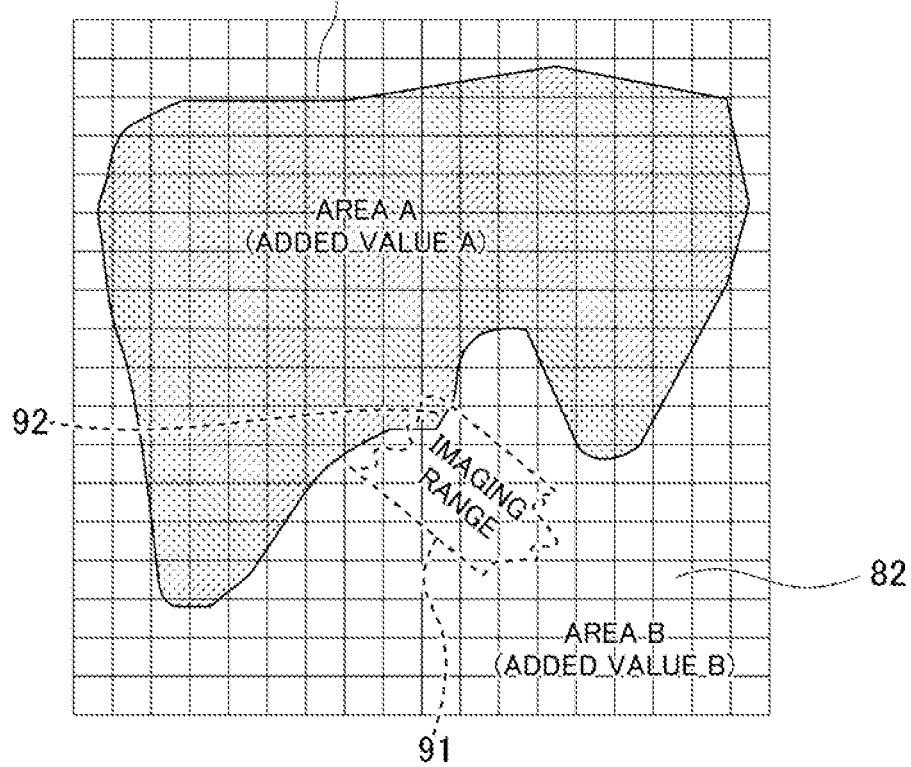
FIG. 9 is a diagram illustrating an example of area determination which is performed by the image processing device according to the embodiment of the invention.

The area determining unit 15 determines to which area in the areas set by the area setting unit 11 the imaging range belongs using the polygon calculated by the polygon calculating unit 14 (Step S65). Specifically, the area determining unit 15 performs the area determination by superimposing the polygon, which is calculated by the polygon calculating unit 14 in Step S64, indicating the actual imaging range on the area setting information set by the area setting unit 11 in Step S61. FIG. 9 is a diagram illustrating an example in which it is determined whether an actual imaging range indicated by a polygon 91 belongs to the area A 81 or the area B 82. In the example illustrated in FIG. 9, since most of the polygon 91 belongs to the area B, the area determining unit 15 determines that the actual imaging range indicated by the polygon 91 belongs to the area B 82. Alternatively, the area determining unit 15 may determine that the polygon 91 belongs to the area A 81 because there is an area 92 in which the polygon 91 overlaps the area A81.

The added value adding unit 16 performs a process which is determined for the determined area on the captured image on the basis of the result of determination of the area to which the captured image from the area determining unit 15 belongs (Step S66). In the example illustrated in FIG. 9, when it is determined that the actual imaging range indicated by the polygon 91 belongs to the area B 82, the added value setting unit 12 performs the process set for the area B. The added value adding unit 16 stores a result of the process performed on the captured image data as the added value addition data 17f in the storage unit 17.

In this way, the image processing device 1 performs the process of adding an added value to each area on images of the imaging areas. By performing the area determination before performing the process of adding an added value in this way, the processes including the area determination process to the image processing of adding an added value to each imaging area can be performed through one image processing. As a result, it is possible to shorten a time for providing a product associated with an image to which an added value is added and to enhance efficiency of using computer resources.

In the example illustrated in FIG. 7, for example, an added value A of the area A is set to perform image processing with a high resolution and a high price. On the other hand, an added value B of the area B is set to provide an image with a low resolution and a low price. By making a difference between products in this way, it is possible to provide image data to a client at a price corresponding to a resolution desired by the client.

Making a difference between products is possible without performing image processing on a captured image. For example, when an earthquake disaster has occurred, the range of a damaged area may be set to the area A, a process of cutting out image data is performed on a captured image belonging to the area A as the added value A, and the resultant image is provided at a low price. As for the other area B, a difference is made between prices by setting a normal price as the added value B to be helpful to social contribution.

A difference may be made between image data provision times by setting the added value A of the area A to one-day delivery and setting the added value B of the area B to usual delivery.

Even when the area A has a constraint of prohibiting image processing thereon, the area determination is performed before performing the image processing and thus this case can be handled by the image processing device 1 according to the embodiment.

In the example illustrated in FIG. 7, two types of areas including the area A 71 and the area B 72 are described, but areas C, D, . . . may be set and area determination for three or more types of areas may be performed.

The flying object in which the synthetic aperture radar is mounted is not limited to an artificial satellite and may be an aircraft, a drone, an airship, a helicopter, or the like.

A user who wants to capture an image or purchase an image may be allowed to select an imaging range which the user wants to image or purchase using the polygon calculated by the image processing device 1 according to the embodiment. That is, a user may be allowed to select an imaging range which the user wants to image or purchase using the polygon calculated by the polygon calculating unit 14. More specifically, a user interface allowing a user to select imaging range which the user wants to image or purchase on the basis of a polygon in which foreshortening is reflected may be provided in a user interface for retrieving and requesting an image captured by the synthetic aperture radar.

Figure 10:
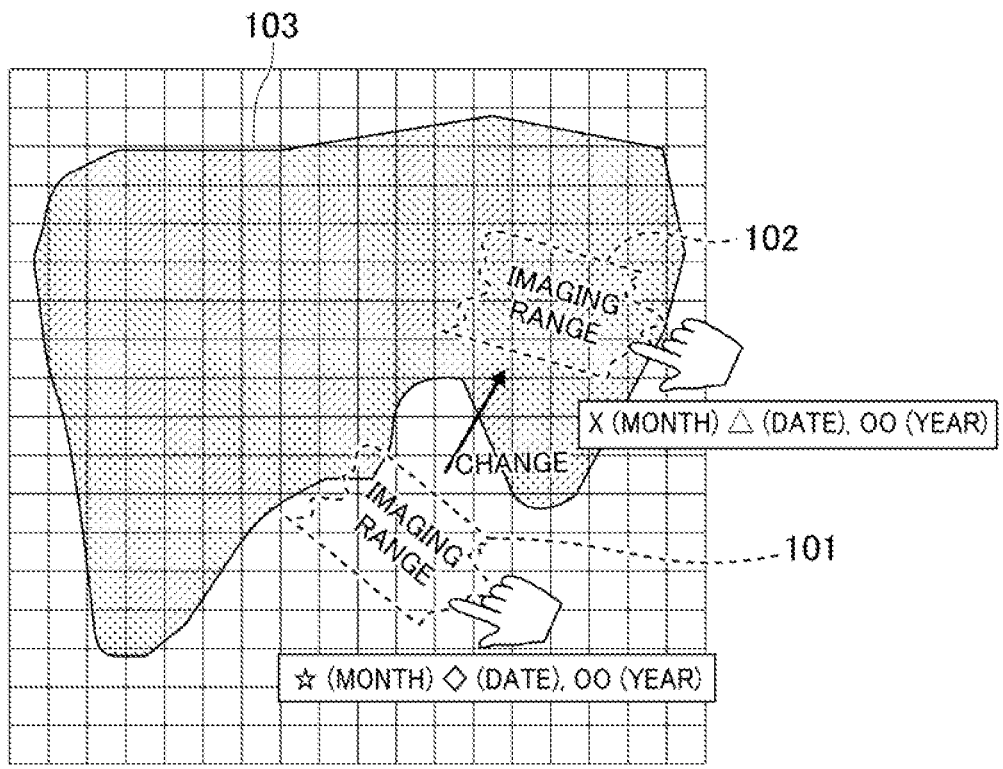
FIG. 10 is a diagram illustrating another example of area determination which is performed by the image processing device according to the embodiment of the invention.

At this time, a shape of a polygon indicating an actual imaging range varies depending on an orbit of a flying object or elevation information of a point at the time of imaging and varies depending on a range and a time which are desired by a user. For example, when there is a difference in price by imaging areas, it is conceivable that a user wants to purchase an image in a low-price range near the very limit. In this case, it may be difficult for a user to designate a low-price range using a rectangular range and the user may want to designate a range which is closest to a low-price range on the basis of a polygon indicating an imaging range. As illustrated in FIG. 10, a user interface may be employed such that the user interface can display a polygon indicating an imaging range changing depending on a position of a cursor on a screen and the time and a user can select a range (area) on the basis of a polygon of an imaging range in which foreshortening is reflected in advance. At this time, when a date and time in the future is designated, the polygon of an imaging range which changes with designation of a position and designation of a time can be prepared in consideration of foreshortening on the basis of a planned value of an orbit at the requested imaging date and time.

Data to which an added value is added by the image processing device 1 according to the embodiment can apply to the fields of global change monitoring, disaster monitoring, oilfield monitoring, agriculture, fisheries, and the like.

Figure 11:
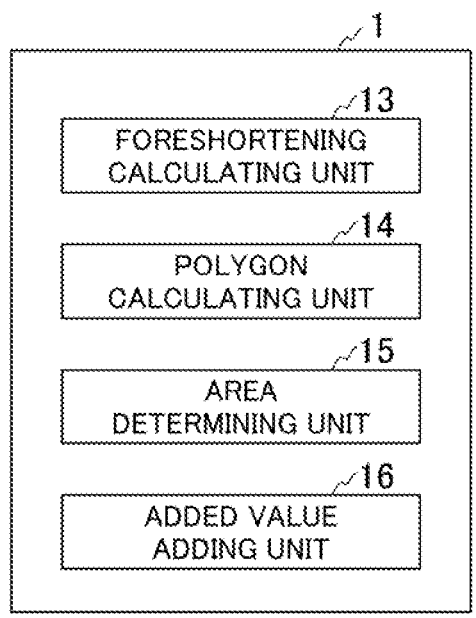
FIG. 11 is a block diagram illustrating a minimum configuration of the image processing device according to the embodiment of the invention.

FIG. 11 is a block diagram illustrating a minimum configuration of the image processing device 1 according to the embodiment of the invention. The image processing device 1 includes a foreshortening calculating unit 13, a polygon calculating unit 14, an area determining unit 15, and an added value adding unit 16.

The foreshortening calculating unit 13 calculates the degree of foreshortening in an imaging range at the time of the synthetic aperture radar imaging on the basis of an orbit of the synthetic aperture radar using a flying object at the time of imaging and elevation data of the earth's surface.

The polygon calculating unit 14 calculates a polygon representing an actual outer boundary of an imaging range by calculating an outer boundary of an actual imaging range in the imaging range using the calculated degree of foreshortening.

The area determining unit 15 determines to which area of two or more areas determined in an area imaged by the synthetic aperture radar the imaging range belongs using the calculated polygon.

The added value adding unit 16 performs a process which is performed for the determined area on an image of the imaging range on the basis of the result of determination of the area to which the imaging range belongs from the area determining unit 15.

The aforementioned processes for image processing may be performed by recording a program for realizing the functions of the processing units of the image processing device 1 illustrated in FIG. 4 in a computer-readable recording medium and causing a computer system to read and execute the program recorded on the recording medium. The "computer system" mentioned herein may include an operating system (OS) or hardware such as peripherals. The "computer system" may include a WWW system having a homepage provision environment (or a display environment). The "computer-readable recording medium" may be a portable medium such as a flexible disk, a magneto-optical disc, a ROM, or a CD-ROM or a storage device such as a hard disk incorporated in a computer system. The "computer-readable recording medium" may include a medium that holds a program for a predetermined time like a volatile memory (RAM) in a computer system which serves as a server or a client when a program is transmitted via a network such as the Internet or a communication circuit line such as a telephone circuit line.

The program may be transmitted from the computer system in which the program is stored in a storage device or the like to another computer system via a transmission medium or using transmission waves in a transmission medium. Here, the "transmission medium" for transmitting a program may be a medium having a function of transmitting information like a network (a communication network) such as the Internet or a communication circuit line (a communication line) such as a telephone circuit line. The program may be a program for realizing some of the aforementioned functions. The program may also be a so-called differential file (a differential program) which can realize the aforementioned functions in combination with another program stored in advance in the computer system.

Priority is claimed on Japanese Patent Application No. 2019-63369, filed Mar. 28, 2019, the content of which is incorporated herein by reference.

REFERENCE SIGNS LIST

1 Image processing device
11 Area setting unit
12 Added value setting unit
13 Foreshortening calculating unit
14 Polygon calculating unit
15 Area determining unit
16 Added value adding unit
17 Storage unit
17a Captured image data
17b Elevation data
17c Area setting data
17d Added value setting data
17e Polygon data
17f Added value addition data

What is claimed is:

1. An image processing device comprising:
a memory storing instructions; and
one or more processors connected to the memory and configured to execute the instructions to:
calculate, for each of imaging from a right side and imaging from a left side, a degree of foreshortening in an imaging range at time of synthetic aperture radar imaging by a synthetic aperture radar using a flying object on the basis of an orbit at the time of the synthetic aperture radar imaging and elevation data above the earth's surface;
calculate, for each of imaging from the right side and imaging from the left side, an outer boundary of the imaging range using the degree of foreshortening;
calculate, for each of imaging from the right side and imaging from the left side, a polygon representing an actual outer boundary of the imaging range using the calculated outer boundary of the imaging range;
determine, for each of imaging from the right side and imaging from the left side, an area to which the imaging range belongs, from among two or more areas of an overall area imaged by the synthetic aperture radar, by using the polygon;
determine, for each of imaging from the right side and imaging from the left side, a parameter in accordance with which image processing is performed, from two or more parameters that have respectively been set for the two or more areas and that are different, wherein the parameter is determined based on the area to which the imaging region belongs; and
perform, for each of imaging from the right side and imaging from the left side, the image processing on an image of the imaging range in accordance with the determined parameter,
wherein for imaging from the right side, a planned outer left boundary of the imaging range extends in a leftwards direction past an actual outer left boundary of the imaging range, and an actual right outer boundary of the imaging range extends in a rightwards direction past a planned right outer boundary of the imaging range,
and wherein for imaging from the left side, the actual outer left boundary of the imaging range extends in the leftwards direction past the planned outer left boundary of the imaging range, and the planned right outer boundary of the imaging range extends in the rightwards direction past the actual right outer boundary of the imaging range.

2. The image processing device according to claim 1, wherein the one or more processors are configured to execute the instructions to use a measured value of an orbit of the flying object at the time of the synthetic aperture radar imaging as the orbit.

3. The image processing device according to claim 1, wherein the one or more processors are configured to execute the instructions to set the two or more areas in the overall area imaged by the synthetic aperture radar.

4. The image processing device according to claim 1, wherein the one or more processors are configured to execute the instructions to determine the image processing that is then performed on the image.

5. An image processing method performed by a computer and comprising:
- calculating a degree of foreshortening in an imaging range at time of imaging by a synthetic aperture radar using a flying object on the basis of an orbit at the time of the imaging and elevation data above the earth's surface;
- calculating an outer boundary of the imaging range using the degree of foreshortening;
- calculate a polygon representing an actual outer boundary of the imaging range using the calculated outer boundary of the imaging range;
- displaying an overall area imaged by the synthetic aperture radar;
- displaying two or more areas of the overall area;
- displaying the calculated polygon against the overall area;
- permitting a user to move the calculated polygon within the overall image to a user-specified position in relation to the two or more areas of the overall area;
- determining, by using the polygon as has been moved to the user-specified position, an area to which the imaging range belongs, from among two or more areas of the overall area imaged by the synthetic aperture radar;
- determining a parameter in accordance with which image processing is performed, from two or more parameters that have respectively been set for the two or more areas and that are different, wherein the parameter is determined based on the area to which the imaging region belongs; and
- performing the image processing on an image of the imaging range in accordance with the determined parameter.

6. A non-transitory recording medium storing an image processing computer program executable by a computer to perform:
- calculating a degree of foreshortening in an imaging range at time of imaging by a synthetic aperture radar using a flying object on the basis of an orbit at the time of the imaging and elevation data above the earth's surface;
- calculating an outer boundary of the imaging range using the degree of foreshortening;
- calculate a polygon representing an actual outer boundary of the imaging range using the calculated outer boundary of the imaging range;
- displaying an overall area imaged by the synthetic aperture radar;
- displaying two or more areas of the overall area;
- displaying the calculated polygon against the overall area;
- permitting a user to move the calculated polygon within the overall image to a user-specified position in relation to the two or more areas of the overall area;
- determining, by using the polygon as has been moved to the user-specified position, an area to which the imaging range belongs, from among two or more areas of the overall area imaged by the synthetic aperture radar;
- determining a parameter in accordance with which image processing is performed, from two or more parameters that have respectively been set for the two or more areas and that are different, wherein the parameter is determined based on the area to which the imaging region belongs; and
- performing the image processing on an image of the imaging range in accordance with the determined parameter.

7. The image processing device according to claim 1, wherein the two or more parameters comprise different resolutions at which the image processing is performed.

8. The image processing device according to claim 1, wherein the two or more areas have respective different added values, such that the two or more parameters have respective different prices in performing the image processing.

9. The image processing device according to claim 1, wherein the two or more areas have respective different added values that are set based on respective image data provision times.

10. The image processing method according to claim 5, wherein the two or more parameters comprise different resolutions at which the image processing is performed.

11. The image processing method according to claim 5, wherein the two or more areas have respective different added values, such that the two or more parameters have respective different prices in performing the image processing.

12. The image processing method according to claim 5, wherein the two or more areas have respective different added values that are set based on respective image data provision times.

13. The non-transitory recording medium according to claim 6, wherein the two or more parameters comprise different resolutions at which the image processing is performed.

14. The non-transitory recording medium according to claim 6, wherein the two or more areas have respective different added values, such that the two or more parameters have respective different prices in performing the image processing.

15. The non-transitory recording medium according to claim 6, wherein the two or more areas have respective different added values that are set based on respective image data provision times.

* * * * *